(12) United States Patent
Wang (10) Patent No.: US 9,690,970 B2
(45) Date of Patent: Jun. 27, 2017

(54) METHOD AND DEVICE FOR MOBILE TERMINAL BIOMETRIC FEATURE IMAGING

(71) Applicant: EYESMART TECHNOLOGY LTD., Beijing (CN)

(72) Inventor: Xiaopeng Wang, Beijing (CN)

(73) Assignee: EYESMART TECHNOLOGY LTD., Beijing (CN)

( * ) Notice: Subject to any disclaimer, the term of this patent is extended or adjusted under 35 U.S.C. 154(b) by 230 days.

(21) Appl. No.: 14/623,062

(22) Filed: Feb. 16, 2015

(65) Prior Publication Data

US 2015/0235070 A1  Aug. 20, 2015

(30) Foreign Application Priority Data

Feb. 17, 2014 (CN) .......................... 2014 1 0052586

(51) Int. Cl.
  *G06K 9/00* (2006.01)
(52) U.S. Cl.
  CPC ..... *G06K 9/00006* (2013.01); *G06K 9/00221* (2013.01); *G06K 9/00597* (2013.01); *G06K 2009/00328* (2013.01)
(58) Field of Classification Search
  CPC ............. G06K 9/0004; G06K 9/00006; G06K 2009/00932; G06K 2009/0006
  See application file for complete search history.

(56) References Cited

U.S. PATENT DOCUMENTS 4,088,405 A   5/1978  Pustka et al.
7,158,323 B2 *  1/2007  Kim ..................... H04N 5/2254
                                          348/235

(Continued)

FOREIGN PATENT DOCUMENTS

CN        1892676       1/2007
CN     101021898 A      8/2007

(Continued)

OTHER PUBLICATIONS

Office Action corresponding to Chinese Application No. 201410052586.6 issued Aug. 16, 2016.

(Continued)

*Primary Examiner* — Wesley Tucker
(74) *Attorney, Agent, or Firm* — Myers Bigel, P.A.

(57) ABSTRACT

A device and method for biometric feature imaging are disclosed. The biometric feature imaging device comprises: an optical lens component adapted for optically imaging a biometric feature of a region of interest, an image sensor adapted for converting an optical image containing the biometric feature into an electronic image, an infrared light source adapted for illuminating the biometric feature of the region of interest with infrared light when the infrared light source is activated, and an optical filter unit; the optical filter unit comprises: a first optical filter adapted for blocking invisible light, a second optical filter adapted for allowing infrared light to pass therethrough, a driving mechanism adapted for moving the first optical filter and the second optical filter, and a driving controller; the driving controller is adapted for generating a first driving signal for driving the driving mechanism to move the first optical filter into an optical path of the optical lens component or a second driving signal for driving the driving mechanism to move the second optical filter into the optical path of the optical lens component.

22 Claims, 7 Drawing Sheets

(56) References Cited

U.S. PATENT DOCUMENTS

| | | | |
|---|---|---|---|
| 8,243,580 B2* | 8/2012 | Sundstrom | H04L 1/0007 370/208 |
| 8,248,692 B2* | 8/2012 | Wu | G02B 5/208 359/350 |
| 8,408,821 B2* | 4/2013 | Wu | H04N 5/33 348/342 |
| 2007/0002159 A1 | 1/2007 | Olsen et al. | |
| 2007/0057764 A1* | 3/2007 | Sato | G06K 9/00006 340/5.52 |
| 2007/0189583 A1* | 8/2007 | Shimada | G06K 9/2018 382/118 |
| 2007/0291157 A1* | 12/2007 | Ding | H04N 5/2254 348/360 |
| 2607/0291157 | 12/2007 | Ding et al. | |
| 2008/0044063 A1* | 2/2008 | Friedman | A61B 3/1216 382/117 |
| 2008/0253622 A1* | 10/2008 | Tosa | G06K 9/00604 382/117 |
| 2009/0016578 A1* | 1/2009 | Yamamoto | G06K 9/00013 382/124 |
| 2010/0134878 A1 | 6/2010 | Wu | |
| 2011/0150304 A1 | 6/2011 | Abe et al. | |
| 2012/0256089 A1* | 10/2012 | Kanda | G06K 9/0004 250/338.1 |
| 2014/0232894 A1 | 8/2014 | Olsen et al. | |
| 2015/0070273 A1* | 3/2015 | He | G06F 3/013 345/156 |
| 2015/0199006 A1* | 7/2015 | He | A61B 3/113 345/158 |

FOREIGN PATENT DOCUMENTS

| | | |
|---|---|---|
| CN | 101427372 A | 5/2009 |
| CN | 102100560 A | 6/2011 |
| CN | 102542258 A | 7/2012 |
| CN | 103593647 A | 2/2014 |
| JP | 2004222938 A | 8/2004 |
| JP | 2008181468 A | 8/2008 |

OTHER PUBLICATIONS

Partial European Search Report corresponding to European Application No. 15155473.0 issued Jul. 10, 2015.
Extended European Search Report corresponding to European Application No. 15155473.0 issued Nov. 2, 2015.
Office Action corresponding to Chinese Application No. 201410052586.6 issued Jan. 26, 2017.
Examination Report corresponding to European Application No. 15155473.0 issued Apr. 3, 2017.

* cited by examiner

METHOD AND DEVICE FOR MOBILE TERMINAL BIOMETRIC FEATURE IMAGING

RELATED APPLICATIONS

The present application claims the benefit of Chinese Patent Application No. 201410052586.6, filed Feb. 17, 2014, the entire disclosure of which is incorporated herein by reference.

FIELD OF THE INVENTION

The present invention relates to optical imaging, particularly to the technology of biometric feature imaging.

BACKGROUND OF THE INVENTION

Biometric feature recognition technology is expanding in the field of identity recognition. Biometric feature recognition technology uses imaging of user's intrinsic biometric feature such as fingerprints, iris, vein etc., as the basis for identity confirmation. Compared with password, identity card and other traditional means of identification, biometric feature recognition technology has many advantages, such as the individual is unique, no memory is needed, hard to be stolen, the operation is easy, and the security level is high. Especially on mobile terminals such as smartphones, tablets and laptops, biometric feature recognition technology is used as a safe and convenient means for identity recognition; and there is a trend to replace the traditional means of identity confirmation with biometric feature recognition technology. During the process of mobile terminal biometric identification, a camera is typically used for imaging. For example, the smartphone operating system can use the front camera to image the user's biometric feature, such as iris and face, at boot time or when an application requires a payment operation, and then confirms the user's identity by image processing.

At present, a camera of a mobile terminal generally uses filters facilitating imaging with visible light. This is because of the presence of light of various wavelengths in the nature; the human eye can recognize light (i.e., visible light) in the wavelength range between 320 nm-760 nm, light with wavelength larger than 760 nm (such as infrared light) can not be identified by the human eye. These invisible lights will affect the CCD or CMOS sensor in the camera, produce color distortion. Therefore, in order to solve the problem of color distortion and enhance the imaging effect, a low-pass filter is generally attached in front of the photosensitive device, which filter prevents the entry of invisible light.

On the other hand, studies show that for biometric feature imaging, especially for imaging iris, face, 3D Face, vein, infrared light (especially the near-infrared light) can achieve a better effect. For example, the iris imaging effects are not same for different races and different individuals. The pigment in iris organization of the white race and the black race is relatively shallow, it is thus easy to obtain a clear image with visible light; while the pigment in iris organization of the yellow race is relatively deep, it may thus be difficult to collect sufficient optical information for imaging with visible light. Infrared light imaging with infrared illumination and an additional filter attached in front of a photosensitive device improves imaging quality to meet the quality requirements of iris recognition algorithms and software, in which the additional filter allows near-infrared light to pass therethrough. In addition, the 3D face recognition using near-infrared light imaging has a higher recognition accuracy than recognition using visible light imaging, since the reflective property of the face skin will be better under infrared light, then the image sensor is able to receive more feature details to distinguish details depth information required by the 3D face recognition. However, as described above, the low-pass filter in the camera of a mobile terminal will prevent invisible light (comprising infrared light) from entering the photosensitive device; for such a mobile terminal, even if a filter allowing passing through of near-infrared light is additionally attached, near-infrared light imaging can not be performed yet.

One solution is to remove the low-pass filter in the camera of the mobile terminal, and only use a double-bandpass filter allowing passing through of both visible and infrared light to perform the infrared light imaging. However, when a camera with such a filter photographs, infrared light in the nature can also be allowed to pass therethrough, which causes the image captured in the sun to be obviously reddish; generally, it is very difficult to adjust the chromatic aberration with software, the imaging effect of photographing is affected.

SUMMARY OF THE INVENTION

Therefore, a solution is desired for solving at least one of the above problems.

According to one aspect of the invention, a biometric feature imaging device is provided. The biometric feature imaging device comprises an optical lens component adapted for optically imaging a biometric feature of a region of interest, an image sensor adapted for converting an optical image containing the biometric feature into an electronic image, an infrared light source (comprising light source emitting near infrared spectrum and light source emitting middle and far infrared spectrum) adapted for illuminating the biometric feature of the region of interest with infrared light (infrared light mentioned hereinafter comprises near-infrared light and middle and far infrared light) when the infrared light source is activated, and an optical filter unit. The optical filter unit comprises: a first optical filter adapted for blocking invisible light, a second optical filter adapted for allowing infrared light to pass therethrough, a driving mechanism adapted to selectively move the first optical filter and the second optical filter, and a driving controller. The driving controller is adapted to generate a first driving signal for driving the driving mechanism to move the first optical filter into an optical path of the optical lens component and a second driving signal for driving the driving mechanism to move the second optical filter into the optical path of the optical lens component.

Wherein the infrared light source comprises at least two infrared light sources (such as LED light sources), which infrared light sources can emit near-infrared spectrum or middle and far infrared spectrum. The at least two LED light sources can be divided into first and second groups; the first group is located on a first side of the optical lens component and the second group is located on a second side of the optical lens component. The infrared light sources of the at least two groups are configured to have a specific emitting angle and illuminate the biometric feature of the region of interest in a crossed manner. The infrared light sources of the at least two groups are configured to illuminate the biometric feature of the region of interest alternately in time. Preferably, the infrared light source comprises an organic light emitting diode (OLED) light source capable of emitting light in near infrared spectrum or light in middle and far infrared spectrum; the OLED light source and the image sensor are integrated on a same substrate, forming an integral image sensor capable of both emitting infrared light and receiving infrared light for imaging.

The driving mechanism comprises: a coil adapted for generating a magnetic field when a current flows therethough; a magnet; a pendulum pin adapted for rotating clockwise or counter-clockwise according to a magnetic force between a magnetic field generated by the coil and a magnetic field of the magnet; and a carrying component connected with the pendulum pin for carrying the first optical filter and the second optical filter, adapted for rotating with the rotation of the pendulum pin, and thereby moving the first optical filter or the second optical filter into the optical path of the optical lens component. The driving mechanism can further comprise a metal sheet adapted for fixing the coil and magnet in position. The driving mechanism can be configured to keep the first optical filter in the optical path of the optical lens component when the driving mechanism is not energized. The carrying component can have a sliding rail structure for facilitating movement. A controlling foot can be set on the sliding rail. The carrying component can further be configured for fixing the optical lens component in position. The driving mechanism can comprise a microelectromechanical system (MEMS) actuator. The first optical filter and the second optical filter can be integrated into the MEMS actuator; the optical filter switching is controlled by a built-in coil, a spring structure, or a displacement structure. The MEMS actuator, the imaging sensor and the optical lens component can form an integral biometric feature imaging module. The optical filter unit can be located in front of the optical lens component, or between the image sensor and the optical lens component.

The driving controller can be configured to generate the first driving signal in response to at least one of the following events:
  a photographing application is invoked;
  no application with a biometric feature recognition function is invoked, or exit an application with a biometric feature recognition function;
  a user input selecting imaging with the first optical filter; and
  in the case of the biometric feature is a facial feature: no user's face has been recognized; or, though a face is recognized, a distance between the optical lens component and the face exceeds a threshold.

The driving controller can be configured to generate the second driving signal in response to at least one of the following events:
  an application with a biometric feature recognition function is invoked;
  a user input selecting imaging with the second optical filter;
  in the case of the biometric feature is a facial feature: a face recognition occurs; and a distance between the optical lens component and the face is below a threshold; and
  a user input unlocking a mobile terminal comprising the optical lens component or an external mobile terminal compatible with the optical lens component.

The driving controller can be configured to generate a corresponding driving signal in response to a user's particular operation relating to a type of the biometric feature to be recognized. The biometric feature comprises at least one of: iris, 3D face, retina, eye prints, lip prints, face and vein.

According to another aspect of the invention, there is provided a mobile terminal comprising the biometric feature imaging device as described above.

According to a further aspect of the invention, there is provided a method for biometric feature imaging. The method comprises:
  generating a first driving signal for moving a first optical filter into an optical path of an optical lens component or a second driving signal for moving a second optical filter into the optical path of the optical lens component; the first optical filter being adapted for blocking invisible light, the second optical filter being adapted for allowing infrared light to pass therethrough;
  moving the first optical filter or the second optical filter into the optical path of the optical lens component according to the generated driving signal; and
  performing ordinary imaging or biometric feature imaging under infrared light with the optical lens component and a corresponding optical filter.

The first driving signal is generated in response to at least one of the following events:
  a photographing application is invoked;
  no application with a biometric feature recognition function being invoked, or exiting an application with a biometric feature recognition function;
  a user input selecting imaging with the first optical filter; and
  when the biological feature is a facial feature: no face recognition occurs, or when a face recognition occurs, a distance between the optical lens component and the face exceeds a threshold.

The second driving signal is generated in response to at least one of the following events:
  an application with a biometric feature recognition function being invoked;
  a user input selecting imaging with the second optical filter;
  when the biological feature is a facial feature: a face recognition occurs and a distance between the optical lens component and the face is below a threshold; and
  a user input unlocking a mobile terminal comprising the optical lens component or an external mobile terminal compatible with the optical lens component.

The step of generating a first driving signal or a second driving signal can comprise generating a corresponding driving signal in response to a user's particular operation relating to a type of the biometric feature to be recognized.

The biometric feature imaging can further comprise activating an infrared light source to illuminate a biometric feature.

BRIEF DESCRIPTION OF THE DRAWINGS

The present invention will be described in detail referring to the following drawings, in which.

DETAILED DESCRIPTION OF THE INVENTION

The embodiments of the present invention will be described in detail referring to the accompanying drawings, which show embodiments of the present invention. However, the present invention may be implemented in many different forms, and the present invention should not be construed as limited to the embodiments set forth herein. In the text, similar reference numerals refer to similar elements.

The term is used herein only for the purpose of describing particular embodiments, and is not intended to limit the present invention. As used herein, the singular forms "a", "the" are intended to comprise the plural forms unless the context clearly indicates otherwise. It should also be understood that when used herein, the term "comprise" specifies the stated features, entirety, steps, operations, elements, and/or components, but does not preclude the presence or addition of one or more other features, entirety, steps, operations, elements, components, and/or groups thereof.

Unless otherwise defined, the terms (comprising technical terms and scientific terms) used herein have the same meaning as commonly understood by those ordinary skilled in the art of the present invention. The term used herein should be interpreted to have the same meaning in the context of this specification and in the relevant field, and should not be interpreted in an idealized or overly formal sense, unless specifically defined herein.

The present disclosure will be described with reference to accompanying drawings in detail below.

Figure 1:
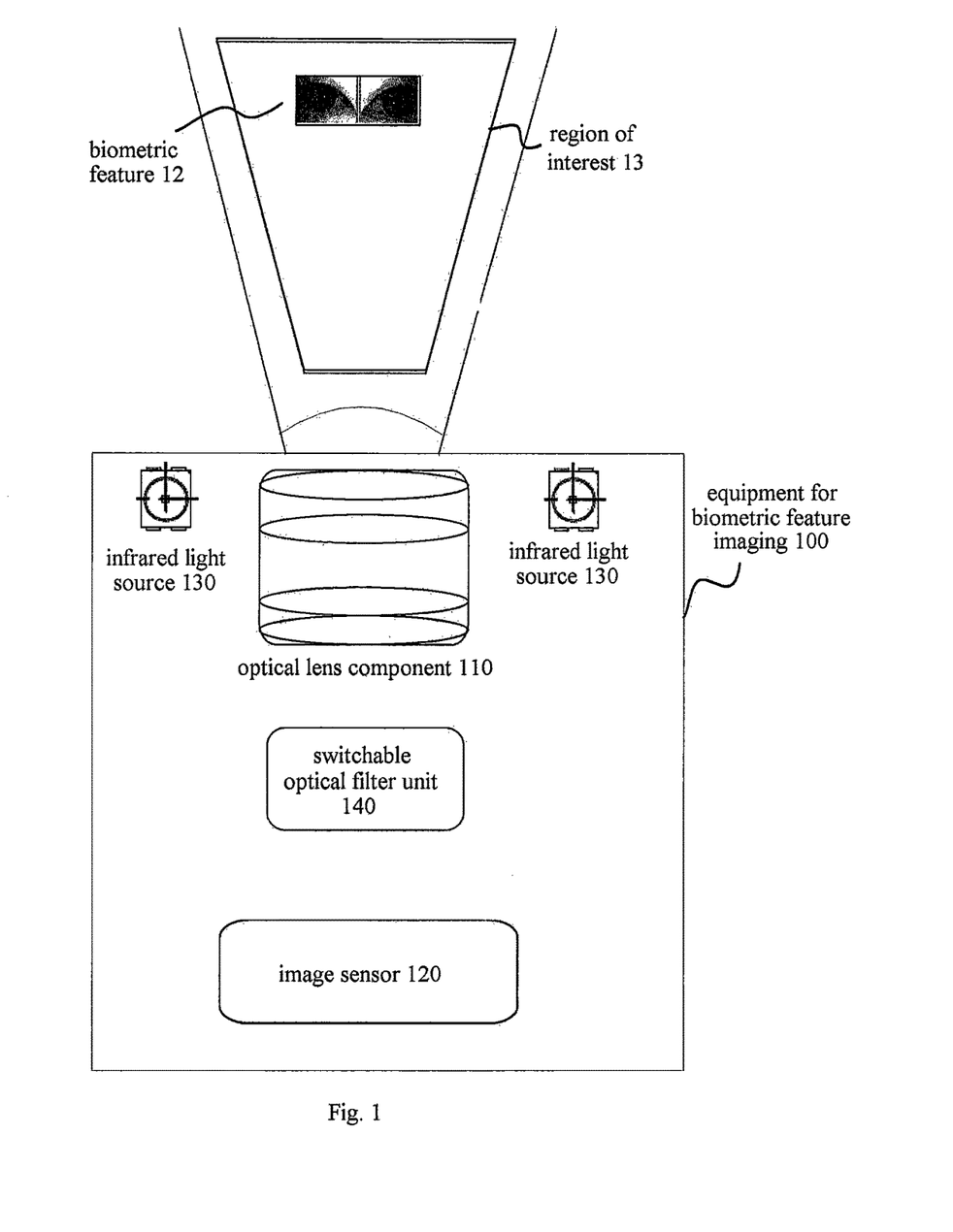
FIG. 1 shows a schematic diagram of a biometric feature imaging device 100 according to an aspect of the present disclosure.

FIG. 1 shows a schematic diagram of a biometric feature imaging device 100 according to an aspect of the present disclosure. Typically, the biometric feature imaging device 100 can be configured in a mobile terminal (such as smart phones, tablets, etc.), the biometric feature imaging device 100 can image the user's biometric feature with infrared light such that the operating system of the mobile terminal, application, etc. can identify the user's identity, while avoiding or reducing the impact on ordinary imaging of the mobile terminal. In this disclosure, iris is taken as an example for biometric features to describe the embodiments of the present disclosure; those skilled in the art would understand that the biometric features also comprise retina, 3D face, eye prints, lip prints, face, vein, and so on.

As shown in FIG. 1, the biometric feature imaging device 100 comprises an optical lens component 110, an image sensor 120, an infrared light source 130 and an optical filter unit 140.

The optical lens component 110 is adapted for optically imaging a biometric feature 12 (such as an iris) of a region of interest 13. In particular, the optical lens component 110 may comprise one or a set of optical lenses, which realizes imaging biometric feature information at a fixed imaging focal plane. The optical lens can be all glass lens, all plastic lens, lens of glass and plastic, liquid lens, or lens made of other mixed materials. The optical lens component 110 may also comprise a fixing structure for fixing the optical lens and a focusing structure for adjusting the focal length of the optical lens. The focusing structure can adjust the imaging properties of the optical lens in order to achieve the biometric feature of the region of interest 13 autofocus control. The region of interest 13 refers to a region that can be imaged with the optical lens component, maintaining a clear focus; namely, the optical lens component can image the biometric feature(s) in the region of interest clearly. For mobile terminals, miniaturization the biometric feature imaging device can be considered. In the applicant's Chinese invention patent application No. 2013104942981 such a technique is described, which is incorporated herein by reference.

The image sensor 120 is adapted for converting an optical image of the biometric feature obtained by the optical lens component 120 into an electronic image. In particular, the image sensor 120 can comprise a photosensitive component, such as a charge-coupled device (CCD) and a complementary metal oxide semiconductor device (CMOS), etc., and use the photosensitive component to convert the optical image of the biometric feature into an electronic signal, such that an electronic image can be obtained. In an embodiment, the electronic image comprises formats of still image and dynamic image; a dynamic image is a still image flow composed of multiple frames of still images arranged in chronological order, also known as video format. An electronic image can be stored with a predetermined image formats, comprising but not limited to, BMP, JPEG, TIFF, RAW, GIF and PNG.

The infrared light source 130 is adapted for illuminating the region of interest 13 with infrared light, in order to obtain an infrared imaging of the biometric feature. For example, the infrared light source 130 may be LED light sources provided on the mobile terminal, the wavelength of each LED light source is preferably in the range of 750 nm~950 nm, i.e., the near-infrared band. The number of the infrared light sources 130 can be one or more. Compared with using one infrared light source, using more infrared light sources can enhance the illuminating effect. For simplicity, mobile terminals equipped with two LED light sources will be discussed as an example; those skilled in the art can understand that the same concept can also be used in the case of three or more infrared light sources.

Figure 2A:
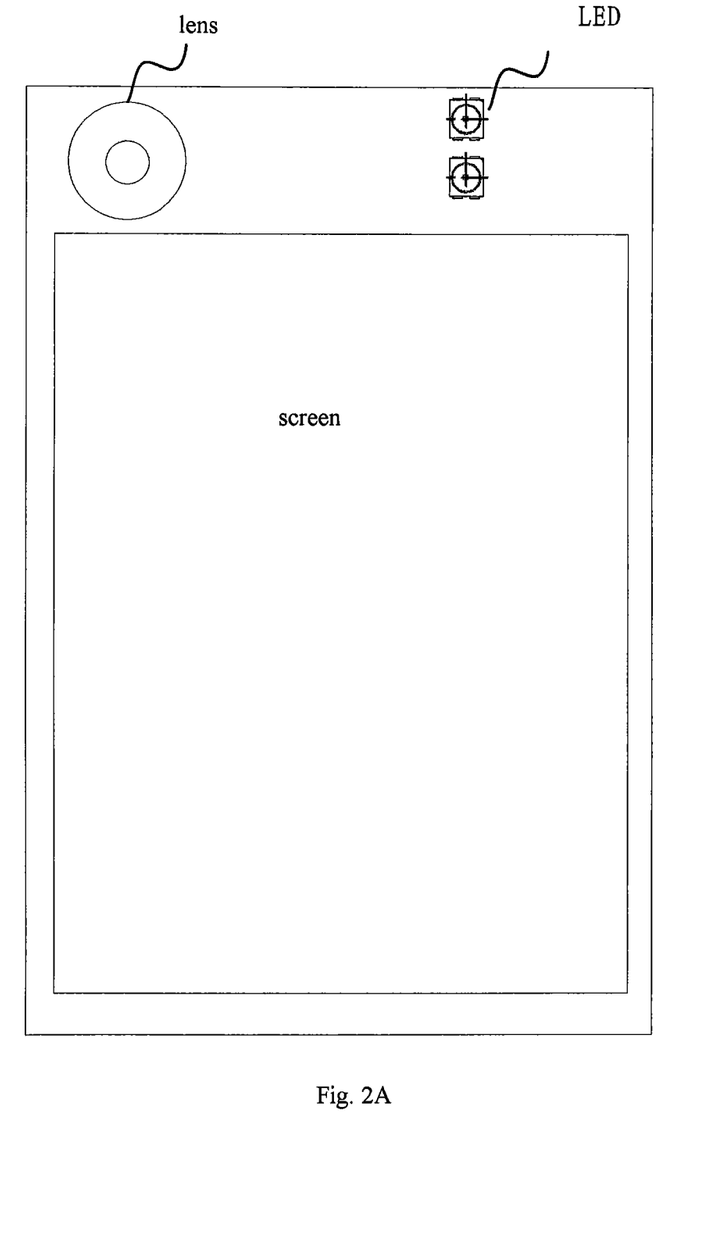
FIG. 2A and FIG. 2B show a schematic diagram of a mobile terminal with two LED light sources according to an aspect of the present disclosure.
Figure 2B:
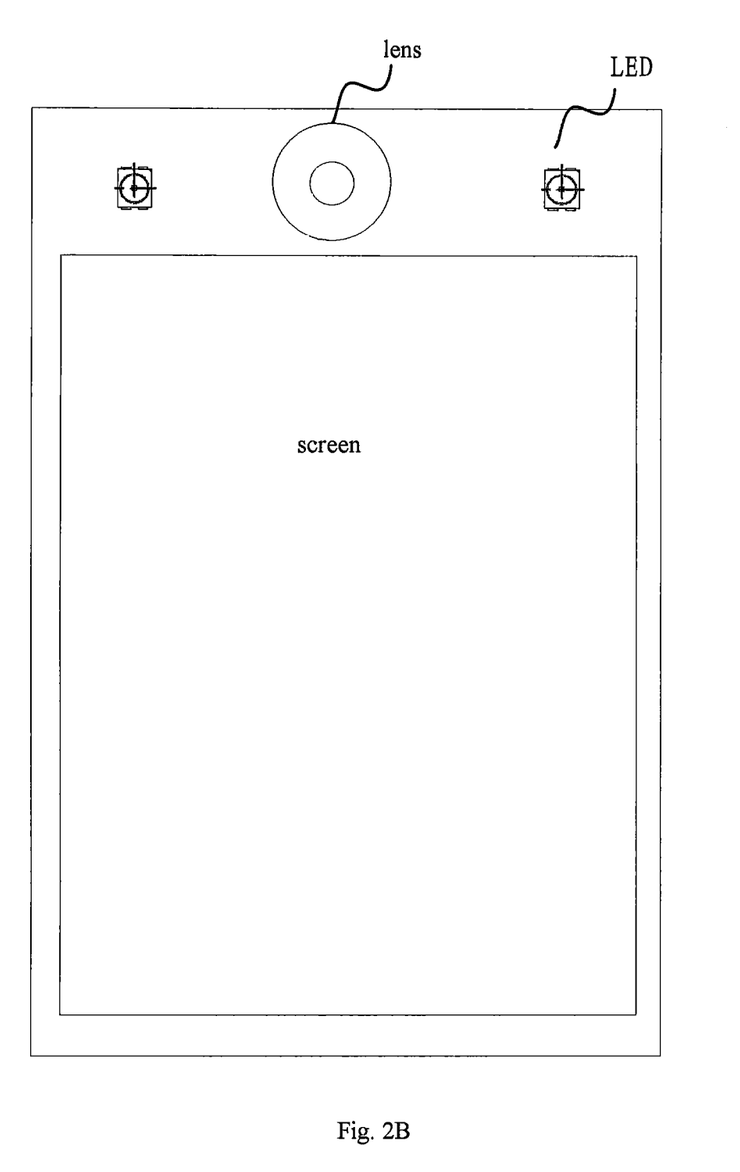

In the embodiments of FIG. 2A and FIG. 2B, the mobile terminals are equipped with two LED light sources to enhance the illuminating effect. These two LED light sources can be located on one side of the optical lens component. For example, when the optical lens component is located at top left on the front of the mobile terminal, these two LED light sources may be located at top right on the front of the mobile terminal, spaced vertically with a certain distance, as shown in FIG. 2A.

Alternatively, these two LED light sources can be respectively located on both sides of the optical lens component, as shown in FIG. 2B. For the features such as the iris, due to the symmetry of the human eyes, the embodiment of a unilateral LED light source group may cause illumination unevenness of light source for the left and right eyes, thus affecting the imaging effect. By distributing two LED light sources on both sides of the optical lens component, illumination uniformity can be improved, thereby enhancing the imaging effect. In addition, especially for the user wearing glasses, the reflected light spot formed by the incident light of the unilateral light source group may strongly interfere the iris feature and affect the subsequent iris recognition effect. In one embodiment, these two LED light sources may have a specific emitting angle and illuminate in a cross manner. For example, when the optical lens component is located at top left on the front of the mobile terminal, an LED light source can be located on the left side of the optical lens component to illuminate the iris texture feature of the user's right eye; another LED light source can be located on the right side of optical lens component (e.g., at top right on the front of the mobile terminal) to illuminate the iris texture feature of the user's left eye. This cross manner of illumination can effectively suppress the interference on the iris feature caused by the reflected light spot of glasses, and improve the recognition efficiency. Emitting angle of the LED light source can be adjusted according to the specific application scenario. For example, regarding the direction of the connecting line between a user and the mobile terminal as a reference direction (typically, front direction for the user), if the LED light source is far from the eye to be illuminated, the angle between the emitting angle of the LED light source and the reference direction can be small; on the contrary, if the LED light source is close to the eye to be illuminated, the angle between the emission angle of the LED light source and the reference direction can be large.

Further, the illumination mode of two LED light sources can be preferably arranged as an illuminating mode of illuminating from left and right alternately. These two LED light sources are not illuminating simultaneously; instead, a lamp on one side illuminates the eye on other side (the symmetrical side), then the lamp is turned off; meanwhile the lamp on the other side is turned on to illuminate the eye on the symmetrical side thereof. The frequency of the alternating illumination can be adjusted with a circuit; the frequency can also be set and modified in the operating system, applications and so on. Such an illumination mode illuminates the biometric feature alternately in time, thus it can be used to remove the influence on each lamp when two or more lamps simultaneously illuminate, such that the effect of the biometric feature imaging for iris can be better and more stable.

Preferably, the infrared light source comprises an organic light emitting diode OLED light source capable of emitting near infrared spectrum or middle and far infrared spectrum, and the infrared OLED light source may integrated with a CMOS/CCD image sensor on a silicon substrate, forming an OLED CMOS or OLED CCD image sensor; the OLED CMOS/OLED CCD image sensor is capable of both emitting infrared light and receiving the infrared light for imaging. Such an infrared light source is combined with the image sensor, integrated as a whole, reducing the volume and saving the assembly costs.

The optical filter unit 140 is able to switch between different filters as needed to meet the requirements of different imaging situations. For example, during an ordinary imaging (such as self-timer of a user), a filter blocking invisible light is moved into an optical path of the optical lens component 110; while during the imaging of a biometric feature, the low-pass filter blocking invisible light is removed, and a filter allowing infrared light to pass therethrough is moved into the optical path of the optical lens component 110. Therefore, the biometric feature imaging device 100 can not only support the user's biometric feature imaging under infrared light in order to accurately identify the user's identity, but also avoid the influence on the ordinary imaging.

Figure 3:
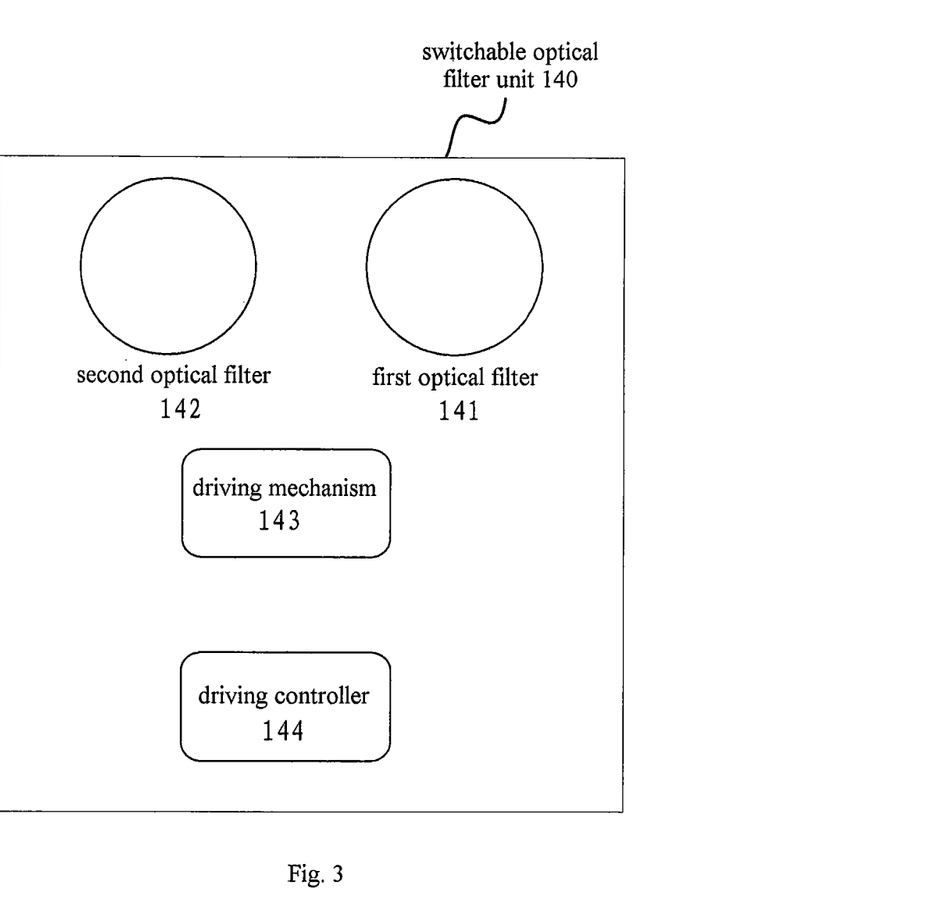
FIG. 3 shows a schematic diagram of an optical filter unit 140 according to an aspect of the present disclosure.

FIG. 3 shows a schematic diagram of an optical filter unit 140 according to an aspect of the present disclosure.

The optical filter unit 140 comprises a first optical filter 141, a second optical filter 142, a driving mechanism 143 and a driving controller 144. The first optical filter 141 can be a low-pass filter blocking invisible light (e.g. infrared light) or other filters facilitating ordinary imaging beneficial effects; for example, the bandwidth allows light in the wavelength range of 300 nm-700 nm to pass therethrough. The material for such a filter may be polycarbonate (PC), acrylic, polymethyl methacrylate (PMMA), or organic glass. Such a filter can also be implemented by coating on these materials.

The second optical filter 142 can be a filter allowing infrared light (comprising near infrared light) to pass therethrough; for example, the bandwidth allows light in the wavelength range of 700 nm-1400 nm to pass therethrough. The material for such a filter may be polycarbonate (PC), acrylic, polymethyl methacrylate (PMMA), or organic glass. Such a filter can also be implemented by coating on these materials. Advantageously, the second optical filter 142 matches the spectral range of the infrared light source 130, allowing light of the infrared light source 130 to pass therethrough. In one embodiment, the optical filter unit 140 can be located in front of the optical lens component 110. In another embodiment, the optical filter unit 140 can also be located between the image sensor 120 and the optical lens component 110, thereby not susceptible to external damage or contamination; the service life can be extended.

The driving mechanism 143 is adapted for moving the first optical filter 141 and the second optical filter 142 such that one filter can be located on the optical path of the optical lens component 110. Two exemplary embodiment of the structure of the driving mechanism 143 will be described below.

Figure 4:
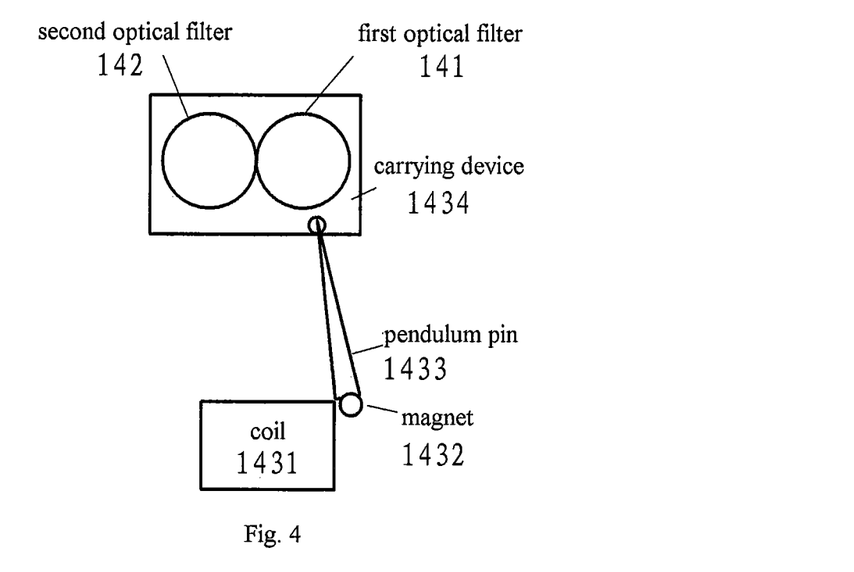
FIG. 4 shows a schematic diagram of a driving mechanism 143 realized with a coil according to an exemplary embodiment of the present disclosure.

FIG. 4 shows a schematic diagram of a driving mechanism 143 realized with a coil according to an exemplary embodiment.

As shown in FIG. 4, the driving mechanism 143 comprises a coil 1431, a magnet 1432, a pendulum pin 1433, and a carrying component 1434. The carrying component 1434 can fix and carry the first optical filter 141 and the second optical filter 142. The magnet 1432 can e.g. have a shape of circle; the pendulum pin 1433 can be made of plastic or other lightweight materials. One end of the pendulum pin 1433 is connected with the magnet 1432; when the coil 1431 is energized, a magnetic field can be generated, which is opposite to or same with the magnetic field of the magnet; the pendulum pin 1433 can be driven to swing by means of the magnetic repulsion or attraction force. The other end of the pendulum pin 1433 is connected with the carrying component 1434, then the carrying component 1434 and the carried filters can move when the pendulum pin 1433 swings, such that the desired filter can be in the optical path of the optical lens component 110.

For example, under a condition of rated load and rated voltage, when a high level is applied to the coil 1431 according to the driving signal from the driving controller 144, N and S poles will be formed respectively at the upper and lower arc of the coil 1431. This coil magnetic field repels the magnetic field of the magnet 1432; the pendulum pin 1433 swings clockwise from a first position to a second position due to magnetic repulsion, while drives the filter carrying component 1434 move to the right; then the second optical filter 142 is moved into the optical path of the optical lens component 110, i.e., the second optical filter 142 is switched to be in working state; the mobile terminal can perform biometric feature imaging under infrared light.

Then, when a low level is applied to the coil 1431 according to the driving signal from the driving controller 144, S and N poles will be formed respectively at the upper and lower arc of the coil 1431. The pendulum pin 1433 swings anti-clockwise from the second position to the first position due to magnetic attraction, while drives the filter carrying component 1434 move to the left; then the first optical filter 141 is moved into the optical path of the optical lens component 110, i.e., the first optical filter 141 is switched to be in working state; the mobile terminal can perform ordinary imaging.

The carrying component 1434 can have a sliding rail structure to facilitate the movement. Sliding rail can be employed with a specific design to reduce the overall sliding friction, increase the service life, and improve the sliding speed. For example, double sliding rail can be used, since its width is relatively small; a controlling foot can be set on the sliding rail according to the actual distance of the displacement, preventing an excessive movement of the filter, which may cause abnormal working.

A metal sheet can be used for fixing the coil and magnet. In addition to the function of fixing, the metal sheet can also damage the magnet ring, performs degaussing for the outside, thereby avoiding interference to/from the outside. Another advantage of this design is that even if a sudden power failure occurs (e.g., the mobile terminal is shut down), the magnet can also attract the metal sheet without any energy, such that the pendulum pin 1433 returns to the first position, and the first optical filter 141 is in working state, then the camera can perform ordinary photographing.

The switching of the filters can be controlled by controlling the power supply voltage level or changing positive and negative voltage; a complex control can also be realized by adding an external circuit adapter plate. The supply voltage of the adapter plate can be higher than the trigger voltage, which is required for exciting the coil to produce a magnetic field; the switching of the filters can be controlled according to different level of the trigger voltage.

Figure 5A:
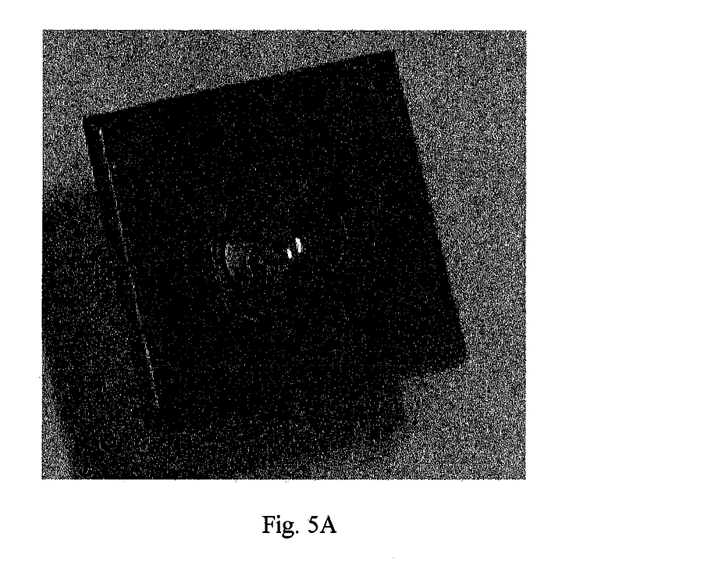
FIG. 5A and FIG. 5B show a schematic diagram of an integrated design for an optical lens submount and a filter carrying component according to an exemplary embodiment of the present disclosure.
Figure 5B:
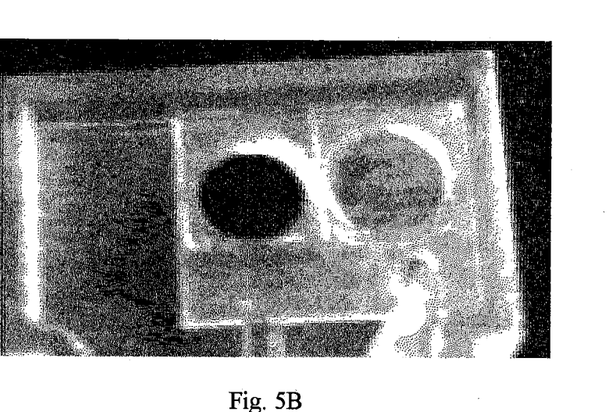

FIG. 5A and FIG. 5B show a schematic diagram of an integrated design for an optical lens submount and a filter carrying component according to an exemplary embodiment. As shown in FIG. 5A, for an optical lens component such as a camera of a mobile terminal, typically a submount is used for fixing the optical lens component e.g. with a threaded connection. FIG. 5B is a product picture showing a carrying component of a driving mechanism, which carrying component is used for fixing and carrying a first optical filter and a second optical filter. In one embodiment, the submount of the optical lens may be integrated with the carrying component of the optical filters, i.e., the carrying component of the optical filters can be used for fixing the optical lens component. Such a design fully saves limited space within the mobile terminal, while also reducing the assembly process.

Figure 6:
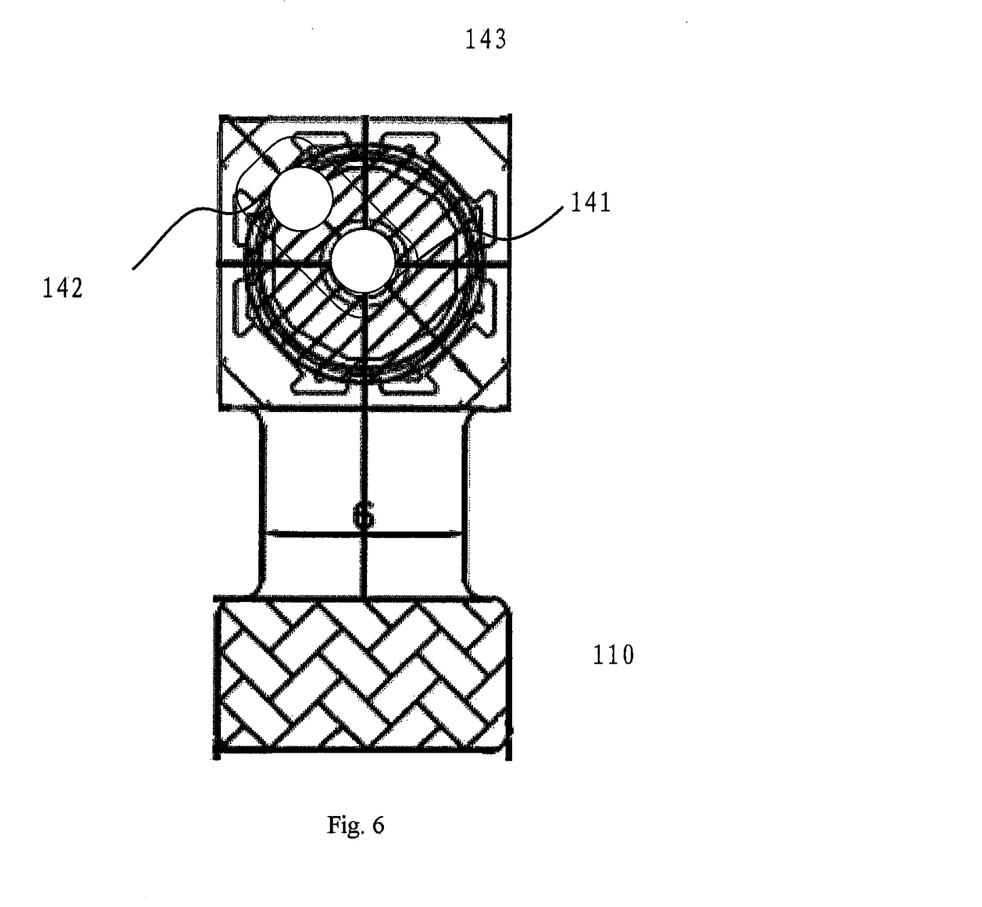
FIG. 6 shows a schematic diagram of a driving mechanism 143 realized with an MEMS actuator according to another exemplary embodiment of the present disclosure.

FIG. 6 shows a schematic diagram of a driving mechanism 143 realized with an MEMS actuator according to another exemplary embodiment.

An MEMS actuator is an MEMS mechanical actuator according to silicon wafer, comprising a vertically movable housing structure assembly, a built-in coil or spring for providing recovery stress, and an electrostatic comb driver for controlling the housing structure assembly; the MEMS actuator can be manufactured with semiconductor process, possessing mechanical and electronic properties. A comb driver is a pair of conductive structures, which can be drawn together due to attraction force generated by electrostatic charge when a DC voltage is applied. In the example shown in FIG. 5, a first optical filter 141 and second optical filter 142 is fixed on a plane by the carrying component; the first optical filter 141 and second optical filter 142 can be pulled through the optical path of the optical lens component 110 by a coil or spring, such that switching between the first optical filter 141 and second optical filter 142 can be performed rapidly. In order to further reduce the volume, the first optical filter 141 and second optical filter 142 may be disposed overlapping in the optical path of the optical lens component 110, switching between these optical filters can be performed by moving these optical filters respectively with two coils or springs.

Compared with other motors, an MEMS actuator is capable of integrating three components (coil, magnet and spring) required in a motor into a single component, solving the complex physical connection between these three components. In addition, the first optical filter and the second optical filter are integrated into the MEMS actuator; a built-in coil, a spring structure or a displacement structure is applied to control the switching; moreover, the MEMS actuator, the imaging sensor and the optical lens component form an integral biometric feature imaging module, such that a smaller volume can be realized, reducing the affect of physical inertia stress between them; they can thus move more quickly and accurately, the speed can be 2-4 times faster than the speed controlled by a normal motor. Meanwhile, manufacturing with semiconductor process (particularly photolithographic techniques) can also reduce the power consumption.

The driving controller 144 generates a driving control signal to control the driving mechanism 143, which performs the switching of filters. The driving controller 144 may control the driving mechanism in various ways, for example, with a DSP chip or directly with the supply voltage. It should be noted that the intelligent degree of the driving controller 144 can be various. In a simple case, the driving controller 144 can be designed to receive a command for switching filters from the operating system or other applications, and generate a corresponding driving control signal. In addition, it may also comprise a filter switching function in an operating system or other applications, which can be determined according to different occasions and inputs, such that the mobile terminal can support filter switching without having to modify operating system or other applications, facilitating the popularization of biometric feature imaging under infrared light. In conclusion, it should be understood that, the driving controller 144 herein should not be narrowly construed to only comprise the component generating a drive control signal, but may also comprise the hardware, software and combinations thereof having control function of controlling filter switching in various conditions; for example, this control function may be implemented by a separate hardware and software in a mobile terminal, and may also be implemented as a general purpose processor of a mobile terminal or a part of an existing operating system and application. In all the cases, these hardware, software, and combinations implementing this control function should be regarded as being within the scope of the driving controller 144.

The driving controller 144 generates a driving signal according to different imaging situations, such that the driving mechanism 143 moves the corresponding optical filters into the optical path of the optical lens component 110. For example, the driving controller 144 can generate a driving signal for driving the first optical filter 141 in response to a mobile terminal invoking a common photographing application, so as to obtain an ordinary photo with a good quality through the first optical filter 141; the driving controller 144 can also generate a driving signal for driving the second optical filter 142 in response to invoking an operating system or certain applications having a biometric feature recognition function (such as mobile payment applications, encrypted applications, mobile screen unlock, etc.) or in response to activating an infrared light source 130, so as to obtain an infrared image of biometric feature with a good quality through the second optical filter 142. When no application with a biometric feature recognition function is invoked, or exit an application with a biometric feature recognition function, a driving signal for driving the first optical filter 141 can be generated. In one embodiment, the driving controller 144 can generate a corresponding driving signal in response to the user's input selection through the button, clicking a touch screen, voice command, etc., so as to select a corresponding imaging mode. In another embodiment, the user's preferred imaging mode can also be determined by e.g. face recognition, distance measurement, etc. For example, if the biometric feature imaging device 100 is used to recognize a face feature (such as the iris), then during imaging of the biometric feature imaging device 100, if no face has been recognized, then it can be determined that it is not required to enter the infrared imaging mode, i.e., the first optical filter 141 should be used. If a face has been recognized, then a possibility is that a biometric feature imaging for the user is required; another possibility is that the user is using self-timer. The imaging mode can be determined by measuring the distance between the user's region of interest and the optical lens component or the mobile terminal. In general, the imaging for iris requires a relatively short distance, since only the region of interest on the user's face is required for the imaging. Instead, a user will often take the camera away from his/her face as much as possible during self-timer, such that the entire face can be contained in the imaging area. Therefore, a corresponding imaging mode can be automatically selected according to the distance between the user's face and the optical lens component and/or the viewing range. In yet another embodiment, in cases such as booting, the screen being in a locked state or in a screen saver state, an infrared imaging mode can be automatically selected according to a user's unlock input (e.g. finger sliding on the touch screen), since in this case a user's authentication is generally required, while a direct ordinary photographing is unlikely performed. In one embodiment, a user can be allowed to switch the imaging mode easily through a specific operation mode; for example, to switch the imaging mode, the user can press a physical or virtual camera button twice in a short time or press the camera button for a long time. A user can also take advantage of a particular operation relating to a type of the biometric feature to be recognized to indicate the switch of the imaging mode. For example, if the biometric feature imaging device 100 is used for recognizing a face biometric feature (such as iris), the user can blink twice or more in a certain period of time to notify the switching of the imaging mode. If the biometric feature imaging device 100 is used for recognizing fingerprints, the user can notify the switching of the imaging mode by making certain gestures (such as thumbs up or making an O-shape with the thumb and index finger). In response to recognizing the corresponding operations, the driving controller 144 generates a corresponding driving signal to select a corresponding imaging mode. The user's specific operation for indicating the imaging mode can be predefined by the operating system or application; it can also be defined by the user according to his/her personal preferences.

Figure 7:
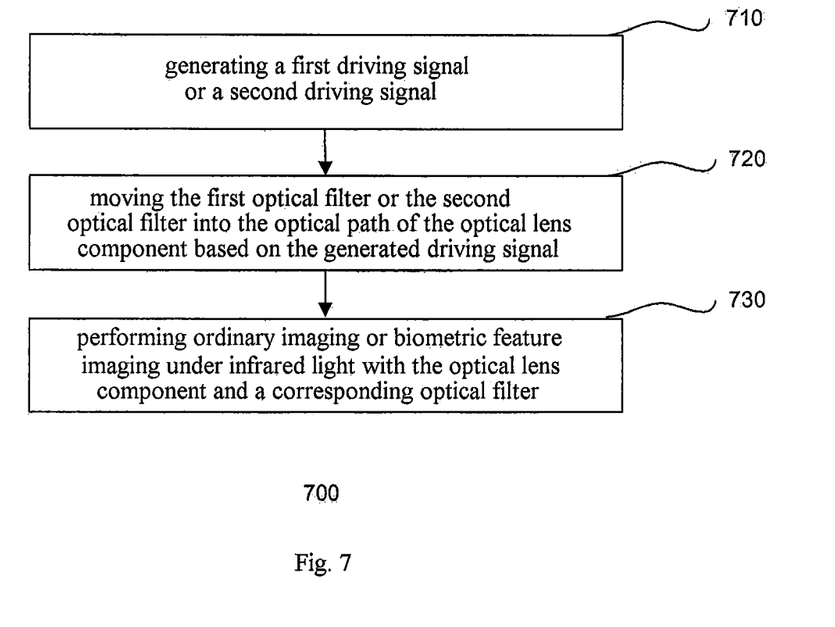
FIG. 7 shows a schematic flow chart of a method for biometric feature imaging 700 according to an aspect of the present disclosure.

FIG. 7 shows a schematic flow chart of a method for biometric feature imaging 700 according to an aspect of the present disclosure.

Step 710: generating a first driving signal for moving a first optical filter into an optical path of an optical lens component or a second driving signal for moving a second optical filter into the optical path of the optical lens component. Step 720: moving the first optical filter or the second optical filter into the optical path of the optical lens component according to the generated driving signal. Step 730: performing ordinary imaging or biometric feature imaging under infrared light with the optical lens component and a corresponding optical filter.

As previously mentioned, the first driving signal is generated in response to at least one of the following events: a photographing application is invoked; no application with a biometric feature recognition function is invoked, or exit an application with a biometric feature recognition function; a user input selecting imaging with the first optical filter; and in the case of the biometric feature is a facial feature: no user's face has been recognized; or, though a face is recognized, a distance between the optical lens component and the face exceeds a threshold. The second driving signal is generated in response to at least one of the following events: an application with a biometric feature recognition function is invoked; a user input selecting imaging with the second optical filter; in the case of the biometric feature is a facial feature: a user's face has been recognized; and a distance between the optical lens component and the face is below a threshold; and a user input unlocking a mobile terminal comprising the biometric feature imaging device or an external mobile terminal matching the optical lens component. The step of generating can comprise generating a corresponding driving signal in response to a user's particular operation relating to a type of the biometric feature to be recognized. The method can further comprise activating an infrared light source to illuminate a biometric feature.

The optical filter unit has advantages such as a small volume and low-cost. By introducing the optical filter unit, a function of infrared iris capturing and imaging can be easily realized with a common traditional camera without affecting the ordinary photographic effect. In addition, by switching the corresponding filters intelligently according to different scenes, the usability of the biometric feature imaging can further be improved.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed:

1. A biometric feature imaging device for imaging a biometric feature of the left and right eyes of an object, comprising:
   an optical lens component adapted to optically image a biometric feature of a region of interest;
   an image sensor adapted to convert an optical image containing the biometric feature into an electronic image;
   an infrared light source adapted to illuminate the biometric feature of the region of interest with infrared light when the infrared light source is activated; and an optical filter unit, the unit comprising:
- a first optical filter adapted to block invisible light;
- a second optical filter adapted to allow infrared light to pass therethrough,
- a driving mechanism adapted to selectively move the first optical filter and the second optical filter, and
- a driving controller adapted to generate a first driving signal for driving the driving mechanism to move the first optical filter into an optical path of the optical lens component and a second driving signal for driving the driving mechanism to move the second optical filter into the optical path of the optical lens component,
- wherein the infrared light source comprises at least two LED light sources, the at least two LED light sources divided into a first group and a second group, wherein the first group is located on a first side of the optical lens component and the second group is located on a second side of the optical lens component, and
- wherein the LED light sources of the first and second groups are arranged at a specific emitting angle to illuminate the biometric feature of the left and right eyes in a crossed manner such that the LED light source group located on the left side of the optical lens component illuminates the biometric feature of the right eye and the LED light source group located on the right side of the optical lens component illuminates the biometric feature of the left eye.

2. The device of claim 1, wherein the LED light sources of the two groups are configured to illuminate the biometric feature of the region of interest alternately in time.

3. The device of claim 1, wherein the infrared light source comprises an organic light emitting diode (OLED) light source capable of emitting light in near infrared spectrum or light in middle and far infrared spectrum.

4. The device of claim 3, wherein the OLED light source and the image sensor are integrated on a same substrate, forming an integral image sensor capable of both emitting infrared light and receiving infrared light for imaging.

5. The device of claim 1, wherein the driving mechanism comprises:
- a coil adapted to generate a magnetic field when a current flows therethough;
- a magnet;
- a pendulum pin adapted to rotate clockwise or counterclockwise according to a magnetic force between a magnetic field generated by the coil and a magnetic field of the magnet; and
- a carrying component connected with the pendulum pin, the carrying component adapted to carry the first optical filter and the second optical filter, and adapted to rotate with the rotation of the pendulum pin, thereby moving the first optical filter or the second optical filter into the optical path of the optical lens component.

6. The device of claim 5, wherein the driving mechanism further comprises a metal sheet adapted to fix the coil and magnet in position.

7. The device of claim 5, wherein the driving mechanism is configured to keep the first optical filter in the optical path of the optical lens component when the driving mechanism is not energized.

8. The device of claim 5, wherein the carrying component has a sliding rail structure for facilitating movement, wherein the sliding rail comprises a controlling foot.

9. The device of claim 5, wherein the carrying component is further configured to fix the optical lens component in position.

10. The device of claim 1, wherein the driving mechanism comprises a microelectromechanical system (MEMS) actuator.

11. The device of claim 10, wherein the first optical filter and the second optical filter are integrated into the MEMS actuator, wherein the optical filter switching is controlled by a built-in coil, a spring structure, or a displacement structure.

12. The device of claim 11, wherein the MEMS actuator, the imaging sensor and the optical lens component form an integral biometric feature imaging module.

13. The device of claim 1, wherein the optical filter unit is located in front of the optical lens component, or between the image sensor and the optical lens component.

14. The device of claim 1, wherein the driving controller is configured to generate a corresponding driving signal in response to a user's particular operation relating to the type of the biometric feature to he recognized.

15. The device of claim 1, wherein the biometric feature comprises at least one of: iris, retina, eye prints, and vein.

16. A method for biometric feature imaging comprising:
- generating a first driving signal for moving a first optical filter into an optical path of an optical lens component or a second driving signal for moving a second optical filter into the optical path of the optical lens component, the first optical filter being adapted to block invisible light, the second optical filter being adapted to allow infrared light to pass therethrough;
- moving the first optical filter or the second optical filter into the optical path of the optical lens component according to the generated driving signal; and
- performing biometric feature imaging on the left and right eyes of an object under infrared light with the optical lens and a corresponding optical filter,
- wherein the biometric feature imaging comprises activating an infrared light source to illuminate a biometric feature of the eyes, wherein the infrared light source comprises at least two LED light sources, the at least two LED light sources divided into a first group and a second group located on a first side and a second side of the optical lens component, respectively, and
- wherein illuminating the biometric feature comprises illuminating the biometric feature of the left and right eyes in a crossed manner such that the LED light source group located on the left side of the optical lens component illuminates the biometric feature of the right eye and the LED light source group located on the right side of the optical lens component illuminates the biometric feature of the left eye.

17. The method of claim 16, wherein the first driving signal is generated in response to at least one of the following events:
- a photographing application being invoked;
- no application with a biometric feature recognition function being invoked or exiting an application with a biometric feature recognition function;
- a user input selecting imaging with the first optical filter; and
- when the biometric feature is a facial feature; no face recognition occurs, or when a face recognition occurs, a distance between the optical lens component and the face exceeds a threshold.

18. The method of claim 16, wherein the second driving signal is generated in response to at least one of the following events:

an application with a biometric feature recognition function being invoked;

a user input selecting imaging with the second optical filter;

when the biometric feature is a facial feature: a face recognition occurs and a distance between the optical lens component and the face is below a threshold; and a user input unlocking a mobile terminal comprising the optical lens component or an external mobile terminal compatible with the optical lens component.

19. The method of claim 16, wherein the step of generating a first driving signal or a second driving signal comprises generating a corresponding driving signal in response to a user's particular operation relating to the type of the biometric feature to be recognized.

20. A mobile terminal comprising the biometric feature imaging device of claim 1.

21. The device of claim 1, wherein the first driving signal is generated in response to at least one of the following events:

a photographing application being invoked;

no application with a biometric feature recognition function being invoked or exiting an application with a biometric feature recognition function;

a user input selecting imaging with the first optical filter; and when the biometric feature is a facial feature: no face recognition occurs, or when a face recognition occurs, a distance between the optical lens component and the face exceeds a threshold.

22. The device of claim 1, wherein the second driving signal is generated in response to at least one of the following events:

an application with a biometric feature recognition function being invoked;

a user input selecting imaging with the second optical filter;

when the biometric feature is a facial feature: a face recognition occurs and a distance between the optical lens component and the face is below a threshold; and a user input unlocking a mobile terminal comprising the optical lens component or an external mobile terminal compatible with the optical lens component.

* * * * *

UNITED STATES PATENT AND TRADEMARK OFFICE
CERTIFICATE OF CORRECTION

PATENT NO. : 9,690,970 B2  
APPLICATION NO. : 14/623062  
DATED : June 27, 2017  
INVENTOR(S) : Xiaopeng Wang Page 1 of 1

It is certified that error appears in the above-identified patent and that said Letters Patent is hereby corrected as shown below:

On the Title Page

Item (30) Foreign Application Priority Data: Please correct "2014 1 0052586" to read -- 2014 1 0052586.6 --

Item (56) References Cited: Please correct "2607/0291157" to read -- 2007/0291157 --

In the Claims

Column 14, Claim 14, Line 20: Please correct "to he recognized." to read -- to be recognized. --

Signed and Sealed this  
Fifteenth Day of May, 2018

Andrei Iancu  
*Director of the United States Patent and Trademark Office*